(12) United States Patent
Kim et al.

(10) Patent No.: US 10,676,096 B2
(45) Date of Patent: Jun. 9, 2020

(54) SYSTEM AND METHOD FOR SENSING ROAD SURFACE CONDITION

(71) Applicant: Mando-Hella Electronics Corporation, Incheon (KR)

(72) Inventors: Shinwook Kim, Seoul (KR); Ki-Man Kim, Gyeonggi-do (KR); Beom-Kyu Kim, Incheon (KR); Ha-Bit Park, Incheon (KR)

(73) Assignee: MANDO-HELLA ELECTRONICS CORPORATION, Incheon (KR)

( * ) Notice: Subject to any disclaimer, the term of this patent is extended or adjusted under 35 U.S.C. 154(b) by 195 days.

(21) Appl. No.: 15/680,157

(22) Filed: Aug. 17, 2017

(65) Prior Publication Data

US 2018/0304897 A1  Oct. 25, 2018

(30) Foreign Application Priority Data

Apr. 25, 2017 (KR) .................. 10-2017-0052770

(51) Int. Cl.
| | |
|---|---|
| *G08G 1/00* | (2006.01) |
| *G08G 1/04* | (2006.01) |
| *G01N 29/14* | (2006.01) |
| *B60R 16/02* | (2006.01) |
| *B60W 40/06* | (2012.01) |

(Continued)

(52) U.S. Cl.
CPC ........... *B60W 40/06* (2013.01); *B60W 10/18* (2013.01); *B60W 30/14* (2013.01); *G01N 29/041* (2013.01); *G01N 29/14* (2013.01); *G01N 29/4427* (2013.01); *G01N 29/46* (2013.01); *G06N 3/04* (2013.01); *G06N 3/063* (2013.01);

(Continued)

(58) Field of Classification Search
None
See application file for complete search history.

(56) References Cited

U.S. PATENT DOCUMENTS

| 5,852,243 A | 12/1998 | Chang et al. |
| 6,954,146 B2 * | 10/2005 | Bhagavathula ..... B60R 16/0237 |
| | | 180/167 |

(Continued)

FOREIGN PATENT DOCUMENTS

| DE | 10 2016 100 736 | 8/2016 |
| EP | 2 343 522 | 7/2011 |

(Continued)

OTHER PUBLICATIONS

Office Action dated Jun. 19, 2018 for German Patent Application No. 10 2017 214 409.2 and its English machine translation by Google Translate.

(Continued)

*Primary Examiner* — Adam D Tissot
(74) *Attorney, Agent, or Firm* — Ladas & Parry, LLP (57) ABSTRACT

Disclosed are a road surface condition sensing system and method. The road surface condition sensing system includes an acoustic sensing unit for sensing an acoustic signal of a floor of a vehicle, and a control unit for calculating a feature vector by Fourier transforming the sensed acoustic signal, comparing the calculated feature vector with a plurality of previously stored feature vectors and returning a first feature vector having the smallest relative distance to the calculated feature vector, and outputting a road surface condition corresponding to the first feature vector.

8 Claims, 5 Drawing Sheets

(51) Int. Cl.
*B60W 10/18* (2012.01)
*G08G 1/16* (2006.01)
*B60W 30/14* (2006.01)
*G01N 29/04* (2006.01)
*G06N 3/04* (2006.01)
*G01N 29/46* (2006.01)
*G06N 3/063* (2006.01)
*G08G 1/0962* (2006.01)
*G01N 29/44* (2006.01)

(52) U.S. Cl.
CPC ........... *G08G 1/09626* (2013.01); *G08G 1/16* (2013.01); *G08G 1/163* (2013.01)

(56) References Cited

U.S. PATENT DOCUMENTS

| | | | | |
|---|---|---|---|---|
| 7,248,958 B2 * | 7/2007 | Watanabe | ............ | B60T 8/1725 |
| | | | | 701/1 |
| 8,401,297 B1 * | 3/2013 | Apostolos | ............ | G06K 9/4628 |
| | | | | 382/181 |
| 2011/0200199 A1 * | 8/2011 | Wakao | ................ | B60W 40/068 |
| | | | | 381/56 |
| 2013/0030680 A1 * | 1/2013 | Friedlander | ........... | B60W 40/06 |
| | | | | 701/117 |
| 2015/0375753 A1 * | 12/2015 | Schrabler | ................ | B60T 8/172 |
| | | | | 701/71 |

FOREIGN PATENT DOCUMENTS

| | | |
|---|---|---|
| JP | 2013-68986 | 4/2013 |
| KR | 10-1152047 | 5/2012 |
| KR | 10-2016-0005500 | 1/2016 |

OTHER PUBLICATIONS

Office Action dated Aug. 2, 2018 for Korean Patent Application No. 10-2017-0052770 and its English machine translation by Google Translate.

* cited by examiner

SYSTEM AND METHOD FOR SENSING ROAD SURFACE CONDITION

CROSS-REFERENCE TO RELATED APPLICATION(S)

This application claims the benefit of Korean Patent Application No. 2017-0052770, filed on Apr. 25, 2017 in the Korean Intellectual Property Office, the disclosure of which is incorporated herein by reference.

BACKGROUND

1. Field

The present disclosure relates to a system and method for sensing road surface condition, and more particularly to a system and method for sensing road surface condition based on noise generated as a tire of a traveling vehicle comes into contact with a road surface.

2. Description of the Related Art

Research on the development of autonomous driving vehicles is continuing today. In an autonomous driving vehicle, the condition of a road surface is an important factor in performing the attitude control of the vehicle in addition to the road situation around the vehicle.

For example, since the degree of friction between a road surface and a vehicle wheel varies depending on wet road surface condition after rain, road surface condition immediately after snowing, frost-thin road surface condition, and the like, the autonomous driving control of a vehicle and the control method for a traveling route according to the degree of friction should be changed.

Therefore, various methods for sensing road surface condition have been studied.

As an example, in order to sense road surface condition, the noise generated during the friction between a tire and a road surface may be measured. The tire noise generated through the friction with a road surface during driving of a vehicle increases as the road surface becomes rougher and decreases as the road surface becomes smoother. In other words, when the friction coefficient according to the road surface condition is examined, it can be seen that the smaller the friction coefficient value is, the smoother the road surface is, and the larger the friction coefficient value is, the rougher the road surface is. Accordingly, a high tire noise means that the road surface is not smooth but rough, or there are many obstacles relatively on the road surface, and a low tire noise means that the road surface is smooth and there are not many obstacles relatively on the road surface.

However, in the conventional case, there is a disadvantage that periodic exchange is troublesome because tire should be periodically exchanged when an additional wire device is installed near the tire to sense the road surface condition, or when the road surface condition is estimated by combining the vehicle outside temperature and weather information.

In addition, securing the weather information and reflecting the road surface condition has a problem in that it is difficult to immediately reflect the situation of the road surface during actual driving.

SUMMARY

Therefore, it is an aspect of the present disclosure to improve the autonomous driving performance of an autonomous driving vehicle by minimizing a calculation amount of a road surface condition sensing system and promptly reflecting road surface condition and displaying it to a driver.

It is another aspect of the present disclosure to improve road surface condition sensing performance.

Accordingly, it is another aspect of the present disclosure to provide a highly reliable road surface condition sensing method by directly analyzing the road surface condition without depending on weather information such as temperature or humidity.

In particular, embodiments of the present disclosure are to provide a systems and methods for recognizing road surface conditions by using a neuromorphic system.

Additional aspects of the present disclosure will be set forth in part in the description which follows and, in part, will be obvious from the description, or may be learned by practice of the present disclosure.

In accordance with one aspect of the present disclosure, a road surface condition sensing system may include an acoustic sensing unit for sensing an acoustic signal of a floor of a vehicle, and a control unit for calculating a feature vector by Fourier transforming the sensed acoustic signal, comparing the calculated feature vector with a plurality of previously stored feature vectors and returning a first feature vector having the smallest relative distance to the calculated feature vector, and outputting a road surface condition corresponding to the first feature vector.

Further, the control unit may provide the outputted road surface condition to an autonomous drive control system of the vehicle.

Further, the autonomous drive control system of the vehicle may include at least one of a forward collision warning system (FCW), an autonomous emergency braking system (AEBS), an adaptive cruise control system (ACC), and a rear-end collision warning system (RCW).

Further, the control unit may learn the calculated feature vector and may additionally input the calculated feature vector into the plurality of previously stored feature vectors.

In accordance with another aspect of the present disclosure, a road surface condition sensing system may include an acoustic sensing unit for sensing an acoustic signal of a floor of a vehicle, a neuromorphic system in which a plurality of neurons storing at least one pattern vector are connected by a parallel bus, and a control unit for calculating a feature vector by Fourier transforming a sensed acoustic signal, inputting the generated feature vector to the neuromorphic system, returning a first feature vector having the smallest relative distance to the inputted feature vector among a plurality of neurons stored in the neuromorphic system, and outputting a road surface condition corresponding to the first feature vector.

In accordance with another aspect of the present disclosure, a road surface condition sensing method may include steps of sensing an acoustic signal of a floor of a vehicle, calculating a feature vector by Fourier transforming the sensed acoustic signal, comparing the calculated feature vector with a plurality of previously stored feature vectors and returning a first feature vector having the smallest relative distance to the calculated feature vector, and outputting a road surface condition corresponding to the first feature vector.

Further, the road surface condition sensing method may further include a step of providing the outputted road surface condition to an autonomous drive control system of the vehicle.

Further, the road surface condition sensing method may further include steps of learning the calculated feature vector, and additionally inputting the calculated feature vector into the plurality of previously stored feature vectors.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

Figure 1:
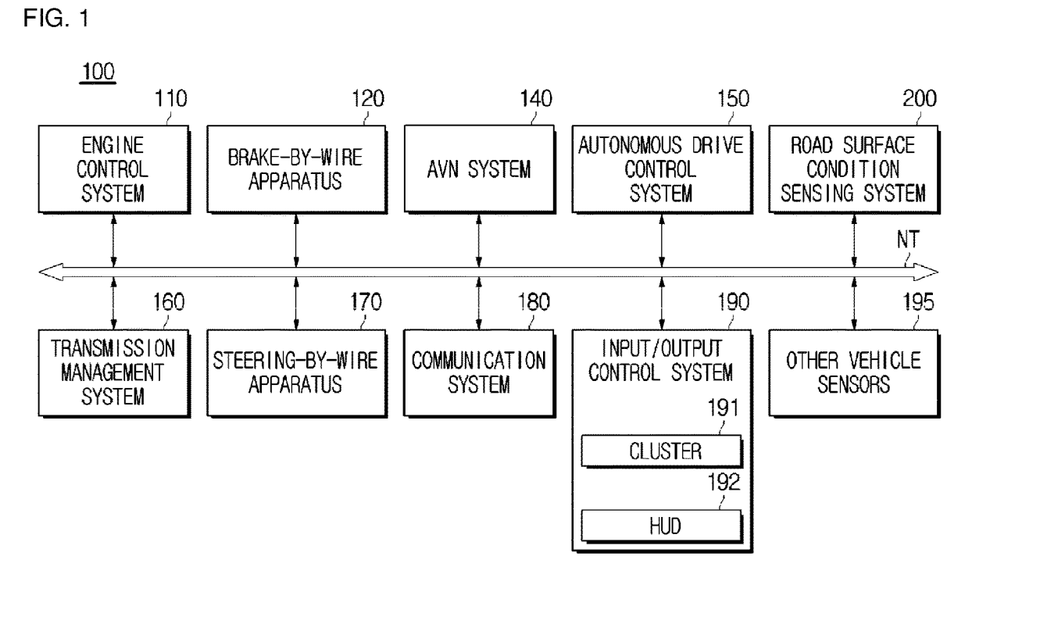
FIG. 1 illustrates various electronic apparatuses of a vehicle including a road surface condition sensing system according to an embodiment.

FIG. 1 illustrates various electronic apparatuses of a vehicle including a road surface condition sensing system according to an embodiment.

Specifically, as illustrated in FIG. 1, a vehicle 1 may include an engine control system 110, a brake-by-wire apparatus 120, an audio video navigation (AVN) system 140, an autonomous drive control system 150, a transmission management system (TMS) 160, a steering-by-wire apparatus 170, a communication system 180, an input/output control system 190, other vehicle sensors 195, a road surface condition sensing system 200 according to the present disclosure, and the like.

However, an electronic unit 100 illustrated in FIG. 1 is only a part of the electronic apparatuses included in the vehicle 1, and the vehicle 1 may be provided with more various electronic units.

Further, the various apparatus of the electronic unit 100 included in the vehicle 1 may communicate with each other via a vehicle communication network NT. The vehicle communication network NT may employ the communication protocols of Media Oriented Systems Transport (MOST) having a communication speed of up to 24.5 Mbps (mega-bits per second), FlexRay having a communication speed of up to 10 Mbps, Controller Area Network (CAN) having a communication speed of 125 kbps (kilo-bits per second) to 1 Mbps, and Local Interconnect Network (LIN) having a communication speed of 20 kbps, and the like.

Such a vehicle communication network NT may employ not only a single communication protocol such as MOST, FlexRay, CAN, and LIN but also a plurality of communication protocols.

The engine control system 110 performs fuel injection control, fuel ratio feedback control, lean burn control, ignition timing control, idling control and the like. The engine control system 110 may be a single apparatus, or may be a plurality of apparatuses connected through a communication.

The brake-by-wire apparatus 120 may control the braking of the vehicle 1, and may typically include an anti-lock brake system (ABS) or the like.

The audio video navigation system 140 is a system for outputting music or images according to a control command of a driver. Specifically, the audio video navigation system 140 may reproduce music or moving images according to a control command of the driver or guide a route to a destination received from a navigation system (not shown).

The transmission management system 160 performs shifting point control, damper clutch control, pressure control during friction clutch on/off, engine torque control during shifting and the like. The transmission management system 160 may be a single apparatus, or may be a plurality of apparatuses connected through a communication.

The steering-by-wire apparatus 170 assists the steering operation of a driver by reducing the steering force during low-speed driving or parking and increasing the steering force during high-speed driving.

The input/output control system 190 receives a driver's control command via a button and displays information corresponding to the driver's control command. The input/output control system 190 may include a cluster display 191 provided in a dashboard (not shown) of the vehicle 1 to display an image, a head up display 192 for projecting an image on a windscreen, and the like.

The cluster display 191 is provided in a dashboard to display an image. Especially, the cluster display 191 is provided adjacent to a windscreen so that a driver U can acquire the operation information of the vehicle 1, the road information or the driving route, etc. in a state in which the driver' line of sight does not deviate greatly from a front of the vehicle 1. The cluster display 191 may employ a liquid crystal display (LCD) panel or an organic light emitting diode (OLEO) panel, etc.

The head up display 192 may project an image on a windscreen. Specifically, the image projected on the windscreen by the head-up display 192 may include motion information of the vehicle 1, road information, or a driving route, etc.

The other vehicle sensors 195 may include an acceleration sensor, a yaw rate sensor, a steering angle sensor, a speed sensor, and the like in order to be included in the vehicle 1 and sense driving information of the vehicle 1.

The communication system 180 may include a wireless communication unit for performing continuous communication with a plurality of vehicles outside the vehicle 1, an internal communication unit for performing communication between various electronic apparatuses in the vehicle 1, and a communication control unit for controlling the wireless communication unit and the internal communication unit.

The autonomous drive control system 150 assists the running of the vehicle 1 and may perform a forward collision avoidance cruise function, a lane departure warning function, a dead zone monitoring function, a rearward surveillance function, and the like. For example, the autonomous drive control system 150 may include a forward collision warning system (FCW) for detecting a vehicle in motion in the same direction ahead of the driving lane and avoiding collision with a forward vehicle, an autonomous emergency braking system (AEBS) that mitigates shocks when a collision with the forward vehicle is unavoidable, an adaptive cruise control system (ACC) that detects a vehicle in motion in the same direction ahead of the driving lane and automatically accelerates or decelerates according to the speed of a forward vehicle, a lane departure warning system (LDWS) that prevents a vehicle from leaving the driving lane, a lane keeping assist system (LKAS) for controlling to return to the present lane when it is determined that a vehicle leaves the driving lane, a blind spot detection apparatus (BSD) that provides a driver with information about vehicles located in blind spots, a rear-end collision warning system (RCW) that detects a vehicle traveling in the same direction behind the driving lane and avoids an collision with a rearward vehicle, and the like.

The road surface condition sensing system 200 for accurately sensing the road surface condition may be mounted on the vehicle 1 in order to operate the autonomous control system 150 properly.

The configuration of the vehicle 1 has been described above.

The configuration and operation of the road surface condition sensing system 200 included in the vehicle 1 will be described below.

Figure 2:
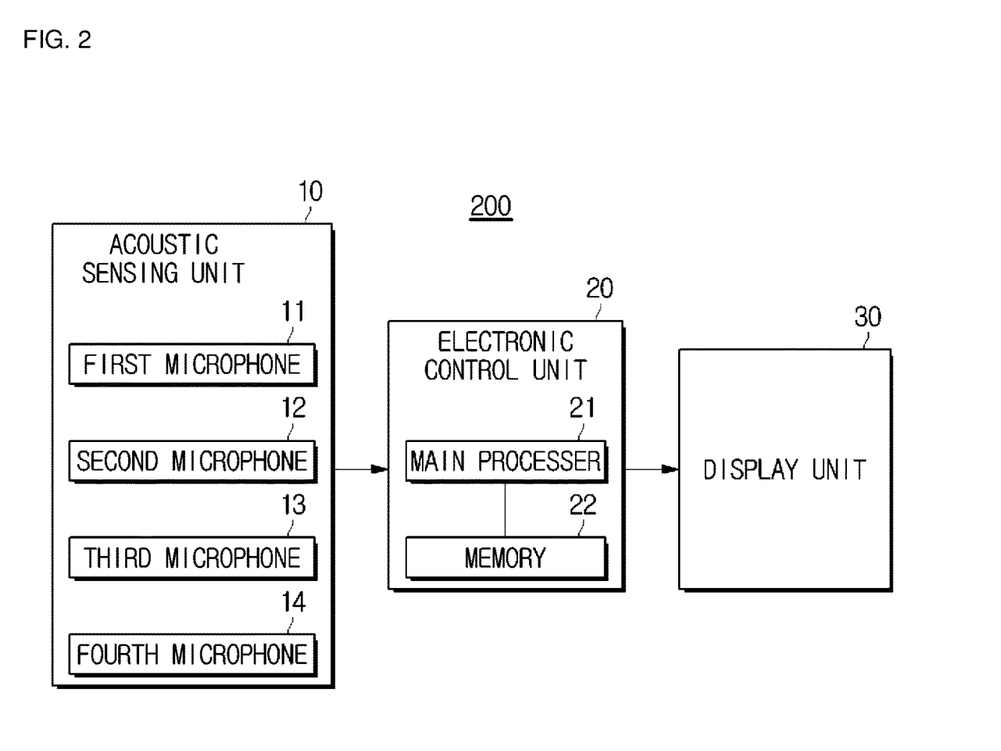
FIG. 2 is a block diagram of a road surface condition sensing system according to an embodiment.
Figure 3:
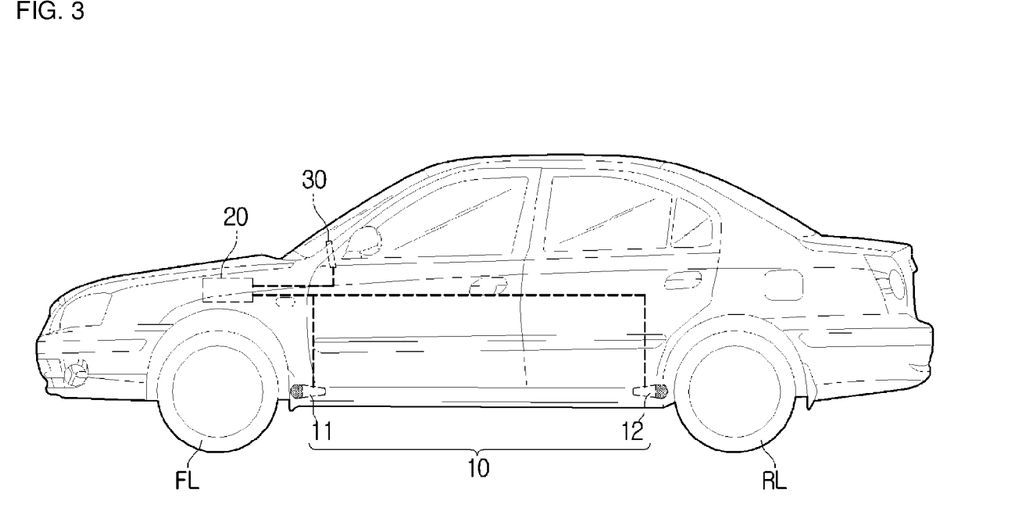
FIG. 3 is an internal perspective view of a vehicle equipped with a road surface condition sensing system according to an embodiment.
Figure 4:
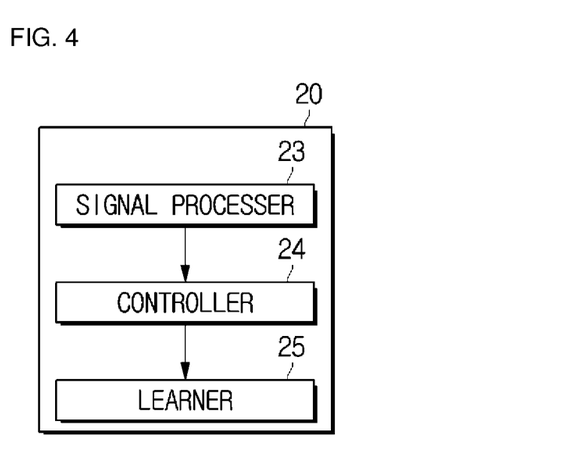
FIG. 4 is an internal block diagram of an electronic control unit included in a road surface condition sensing system according to an embodiment.

FIG. 2 is a block diagram of a road surface condition sensing system according to an embodiment, FIG. 3 is an internal perspective view of a vehicle equipped with a road surface condition sensing system according to an embodiment, and FIG. 4 is an internal block diagram of an electronic control unit included in a road surface condition sensing system according to an embodiment.

Figure 5:
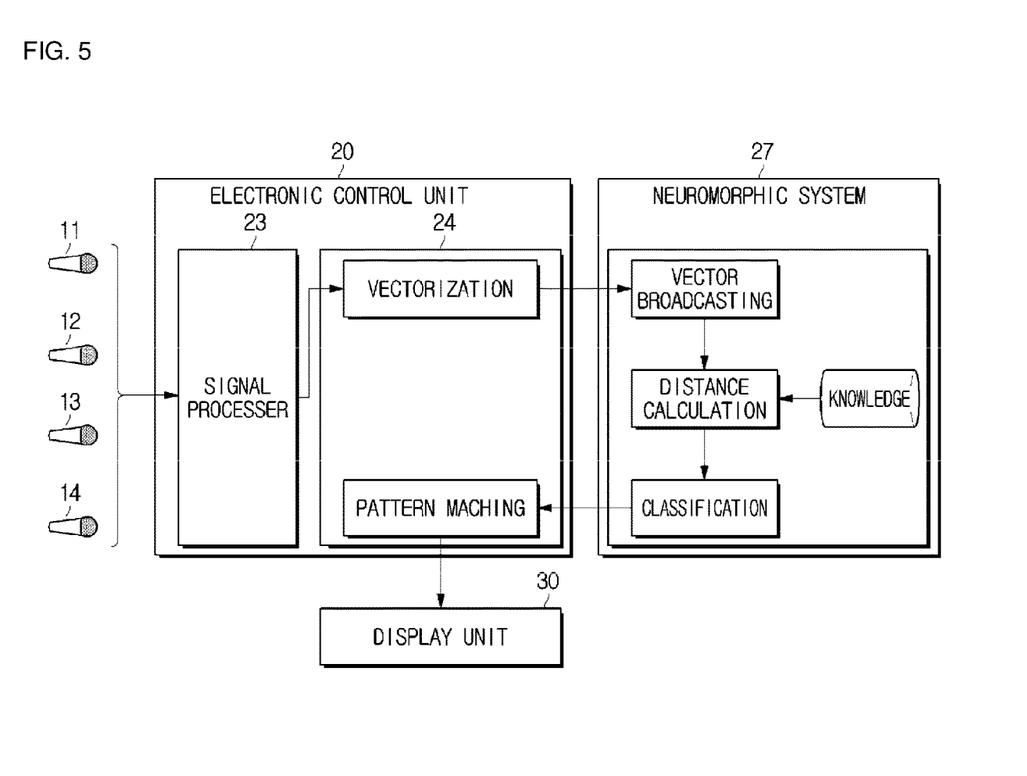
FIG. 5 is a block diagram of a road surface condition sensing system equipped with a neuromorphic system according to another embodiment.

Also, FIG. 5 is a block diagram of a road surface condition sensing system equipped with a neuromorphic system according to another embodiment.

First, referring to FIG. 2, the road surface condition sensing system 200 includes an acoustic sensing unit 10, an electronic control unit 20, and a display unit 30.

Herein, the acoustic sensing unit 10, the electronic control unit 20 and the display unit 30 may communicate with each other through the communication network NT of the vehicle 1 and the control values of the road surface condition sensing system 200 may also be transmitted to the autonomous drive control system 150 via the communication network NT of the vehicle 1.

The acoustic sensing unit 10 including at least one microphone may be installed in the vicinity of the wheels FR, FL, RR and RL of the vehicle 1 to obtain noise generated when friction occurs between the wheels of the vehicle 1 and the road surface as an input signal.

Specifically, FIG. 3 is an embodiment for explaining that a first microphone 11, a second microphone 12, a third microphone 13 and a fourth microphone 14 shown in FIG. 2 are mounted on the vehicle 1.

As illustrated in FIG. 3, the vehicle 1 may include a first microphone 11 installed near a left front wheel FL of the vehicle lower portion and a second microphone 12 installed near a left rear wheel RL of a vehicle lower portion, and may further include a third microphone 13 installed near a right front wheel FR of a vehicle lower portion and a fourth microphone 14 installed near a right rear wheel RR of a vehicle lower portion which are not shown.

Although it has been described in the present embodiment that sound is obtained through the first microphone 11 to the fourth microphone 14 of the acoustic sensing unit 10, it is not necessary to measure the noise of each wheel, and noise may also be measured based on one or two microphones. Therefore, the sound acquired through the first microphone 11 to the fourth microphone 14 may be transmitted to the electronic control unit 20.

As in an internal perspective view of the vehicle 1 of FIG. 3, the electronic control unit 20 may be located inside the vehicle 1 and collectively control the road surface condition sensing system 200, and may display a result value of the road surface condition sensing system 200 to the driver through the display unit (30 in FIG. 3).

That is, the electronic control unit 20, which collectively controls the road surface condition sensing system 200, includes a main processer 21 for determining road surface condition based on acoustic information obtained by the acoustic sensing unit 10, and a memory 22 for storing various data.

The memory 22, which stores programs and data of the road surface condition sensing system 200, may include a nonvolatile memory such as a flash memory, a read only memory (ROM), an erasable programmable read only memory (EPROM), and an electrically erasable programmable read only memory (EEPROM), as well as a volatile memory such as an S-RAM or a D-RAM.

The nonvolatile memory may semi-permanently store control programs and control data for controlling the operation of the road surface condition sensing system 200, and the volatile memory can retrieve and temporarily stores the control programs and the control data from the nonvolatile memory, and temporarily store acoustic information sensed by the acoustic sensing unit 10 and various control signals outputted from the main processer 21.

Hereinafter, a method for determining road surface condition in the electronic control unit 20 of the road surface condition sensing system 200 illustrated in FIG. 2 will be described. Specifically, as illustrated in FIG. 4, which is a block diagram for explaining the software configuration of the electronic control unit 20, the electronic control unit 20 includes a signal processer 23 for processing acoustic information obtained from the acoustic sensing unit 10, a controller 24 for determining road surface condition information based on the signal acquired by the signal processer 23, and a learner 25 that learns a road surface condition value.

However, the functions performed by the configuration of the controller 24 and the learner 25 in the electronic control unit 20 of the road surface condition sensing system 200 illustrated in FIG. 4 may be performed by the configuration of pattern matching including a neuromorphic system 27 illustrated in FIG. 5. Particularly, In particular, by operating the road surface condition sensing system 200 equipped with the neuromorphic system 27, the road surface condition may be determined more quickly and accurately.

Specifically, the road surface condition sensing system 200 illustrated in FIG. 5 may include the electronic control unit 20 that processes signals from at least one or more microphones (the first microphone 11 to the fourth microphone 14) included in the acoustic sensing unit 10 and controls so as to display pattern-matched road surface condition information based on signals processed by the neuromorphic system 27, the neuromorphic system 27 composed of a plurality of neurons in order to perform pattern matching. Hereinafter, the signal processer 23 having the same configuration as shown in FIGS. 4 and 5 will be described first.

The signal processer 23 processes an acoustic signal obtained by the acoustic sensing unit 10. Specifically, the signal processer 23 acquires acoustic signals received in a continuous stream format from the sound sensing unit 10 on a frame-by-frame basis to extract a feature point. In particular, the Mel-frequency cepstrum coefficient (MFCC) transformation method may be used to extract a feature point.

Specifically, the signal processor 23 may be configured so that one-half of each frame overlaps when frames are formed. This is to attenuate discontinuity between frames by passing through a window filter. As an example of a window filter, a hamming window may be used.

Next, the signal processor 23 generates a cepstrum based on each frame passed through the window filter. The cepstrum is a second-order frequency spectrum obtained by Fourier-transforming the spectrum of a frame once again, which is a function constituted by a function of a time domain.

The signal processor 23 performs a fast Fourier transform (FFT), a triangular filter bank, a log transformation, and a discrete cosine transform (DCT).

First, an FFT module converts a time domain acoustic signal into a frequency domain signal, and a 256 point FFT may be used. A triangular filter bank facilitates the detection of the energy peaks at each frequency point and may lower the dimension for the signal in the frequency domain through the FFT. That is, the obtained frequency domain signal is divided by a plurality of band pass filters.

A log converter performs a log operation on each coefficient passed through the triangular filter bank, thereby performing preprocessing of the calculation of a cepstrum coefficient.

A DCT module then separates the generated cepstrum into low frequency and high-frequency regions of the coefficients and extracts feature points with respect to the waveform of acoustic signals corresponding to the coefficients located in the low-frequency region.

Therefore, the signal processor 23 may acquire feature vectors with respect to the coefficients concentrated in the low-frequency region.

Further, as an example, the signal processor 23 performs a function of generating a feature vector (input vector) to be input to the neuromorphic system 27 of FIG. 5. The neuromorphic system 27 may simultaneously propagate the vector input to the neuromorphic system 27 to the thousands of neurons constituting the inside of the neuromorphic system through a parallel bus.

That is, each neuron in the neuromorphic system 27 may start measuring the relative distance between the pattern vectors and the input vectors stored in the neurons when the feature vectors start to be input, and continue to update the distance values until the input of the feature vectors is complete.

A neuromorphic integrated circuit, a next-generation semiconductor that mimics the human brain neurons, consumes less power and allows pattern recognition and analysis, pattern learning and comparison through a single integrated circuit.

Specifically, the neuromorphic system 27 compares the received feature vector with a reference pattern stored in the knowledge, and re-transmits the category value of the neuron keeping the most similar pattern to the controller 24 as a return value. Herein, the knowledge may be a database in which patterns stored by neurons are to be a database.

Thus, the electronic control unit 20 sends and receives data to and from the neuromorphic system 27, and processes the acquired acoustic signal.

In particular, the electronic control unit 20 performs a matching analysis with the classified patterns stored in advance in the neuromorphic system 27 based on the calculated feature vectors.

Accordingly, the electronic control unit 20 compares pattern of the calculated feature vector with a plurality of patterns stored in an integrated circuit (IC) of the neuromorphic system 27. That is, the electronic control unit 20 returns the result of matching the feature vector of an acoustic signal, which is one frame, with the pattern most similar to the database stored in the neuromorphic system 27, without performing any additional computation.

Therefore, the controller 24 receives a plurality of sound frame classification results inputted from the neuromorphic system 27 and performs a final determination on the current road surface condition. As a result, the road surface condition synthesizing the recognition results of the neuromorphic system 27 is outputted from the controller 24.

To this end, the controller 24 may store a plurality of patterns in a flash memory, a read only memory (ROM), an erasable programmable read only memory (EPROM), an electrically erasable programmable read only memory (EEPROM), or the like, which are nonvolatile memories. Accordingly, the controller 24 may record noises of the road surface under various temperature conditions and various environmental conditions, convert them into feature vectors, and store them in advance.

Therefore, the road surface condition sensing system 200 according to the present disclosure performs pattern matching by loading a plurality of feature vectors stored in advance into the memory of the neuromorphic system 27 during the actual operation of the system.

Next, when a feature vector obtained in the controller 24 is not present in the database including a plurality of previously stored feature vectors, the learner 25 of FIG. 4 may perform learning by adding the feature vector to the database as a new type of feature vector pattern. That is, the learner 25 may add vectors to be included in the knowledge of the neuromorphic system 27 of FIG. 5.

Further, the learner 25 is included in the memory 22 described with reference to FIG. 2, and may be especially stored in a flash memory, a read only memory (ROM), an erasable programmable read only memory (EPROM), an electrically erasable programmable read only memory (EEPROM), or the like, which are nonvolatile memories. Further, although not illustrated, the learner 25 may appropriately edit or process the road surface acoustic signals recorded in various environments as the road surface condition sensing system 200 itself is connected to a PC system (wireless or wired). In this case, a serial communication or a USB interface, etc. may be used for connection to the PC system, but it is not limited thereto.

Therefore, in the neuromorphic system 27 of FIG. 5, each neuron has a local memory, and each pattern is stored in this memory. The pattern to be stored in the local memory of the neurons is obtained from off-line through a separate program.

Finally, the road surface condition sensing system 200 may include the configuration of the display unit 30. The display unit 30 may display the road surface condition determined by the controller 24 to the driver. Specifically, the display unit 30 may display through the configuration of the cluster display 191 of the input/output control system 190, but it is not limited thereto.

In addition, the road surface condition sensing system 200 may provide the sensed road surface condition information to the autonomous drive control system 150, thereby assisting the autonomous running of the vehicle to be performed safely.

The configuration of the road surface condition sensing system 200 according to the present disclosure has been described above.

Figure 6:
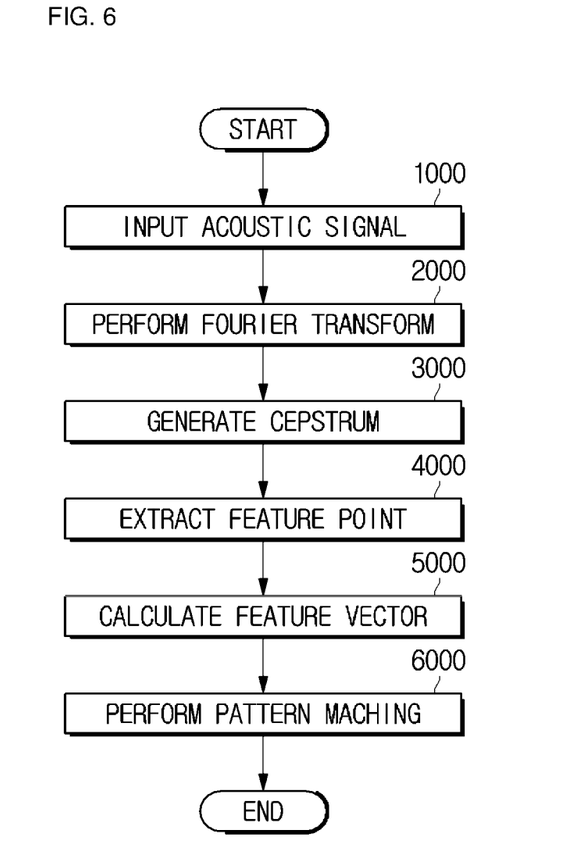
FIG. 6 is a flowchart illustrating a method of sensing road surface condition according to an embodiment.
Figure 7:
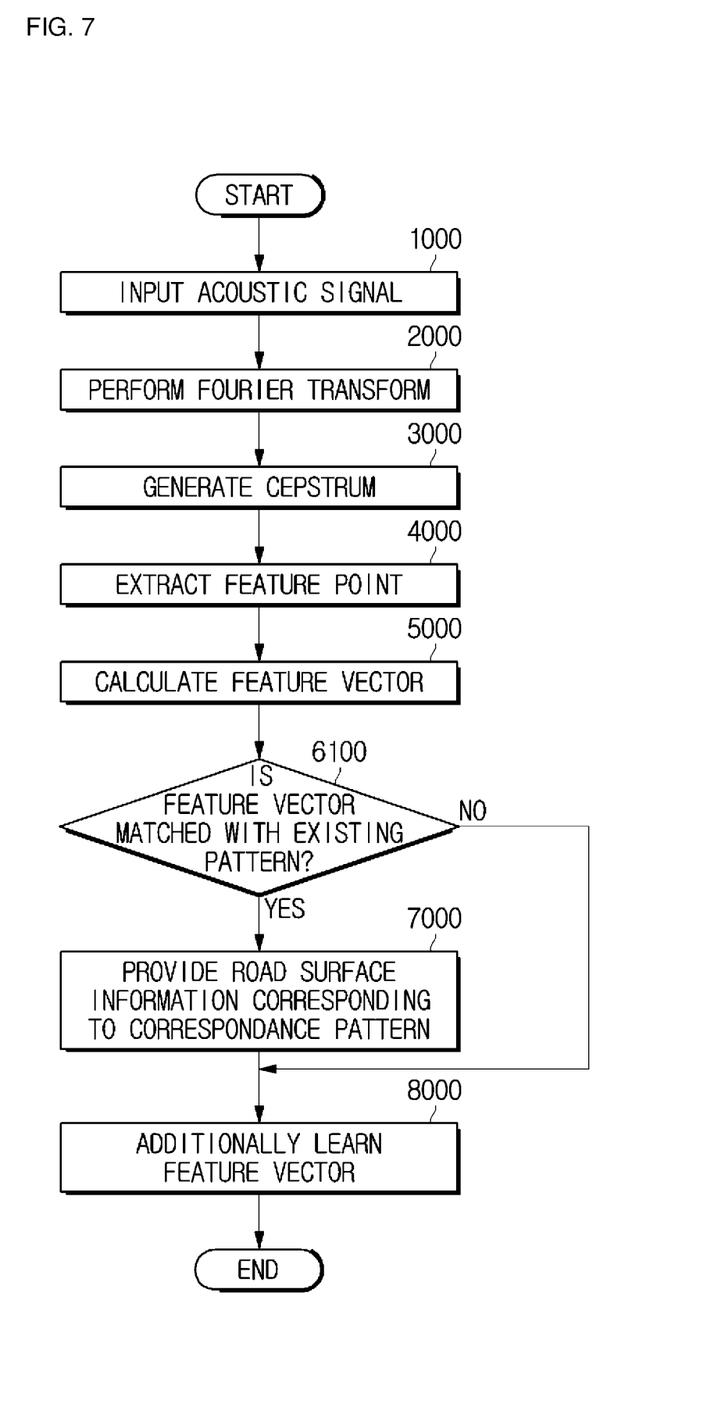
FIG. 7 is a flowchart illustrating a method of sensing road surface condition according to another embodiment.

Hereinafter, the operation of the road surface condition sensing system 200 according to the present disclosure will be described. FIGS. 6 and 7 are flowcharts illustrating a road surface condition sensing method.

First, as illustrated in FIG. 6, the road surface condition sensing system 200 receives an acoustic signal from the acoustic sensing unit 10 (1000).

The road surface condition sensing system 200 performs the Fourier transform on the received acoustic signal (2000). Specifically, the Fourier transform is performed by the signal processor 23 in the electronic control unit 20, and the signal processor 23 extracts a feature point by acquiring an acoustic signal received in a continuous stream format on a frame basis in the acoustic sensing unit 10. Specifically, the signal processor 23 may be configured so that one-half of each frame overlaps when frames are formed. This is to attenuate discontinuity between frames by passing through a window filter. As an example of a window filter, a hamming window may be used.

Next, the signal processor 23 generates a cepstrum based on each frame passed through the window filter (3000). Further, based on the generated cepstrum, the signal processer 23 extracts feature points (4000), and acquires a feature vector for the coefficients concentrated in the low-frequency region based on the extracted feature points (5000).

At this time, the feature vector is subjected to pattern matching with a plurality of feature vectors previously stored in the electronic control unit 20 (6000), and the electronic control unit 20 confirms the condition of the road surface on which the vehicle is currently traveling.

Specifically, the electronic control unit 20 calculates a feature vector and performs pattern matching between the feature vector and a plurality of previously stored feature vectors to determine road surface condition (6000). Hereinafter, a control method after pattern matching between the calculated feature vector and a plurality of previously stored feature vectors, which are provided by the electronic control unit 20, will be described with reference to the flowchart of FIG. 7.

First, when a pattern is matched by performing pattern matching between a feature vector and a plurality of previously stored feature vectors (YES of 6100), the electronic control unit 20 provides road surface information corresponding to the pattern (7000).

Further, if a feature vector acquired by the controller 24 is not present in the database including the plurality of previously stored feature vectors (NO of 6100), the learner 25 of the road surface condition sensing system 200 may perform learning by adding the feature vector to the database as a new type of feature vector pattern (8000).

Further, the learner 25 of the road surface condition sensing system 200 may add feature vectors acquired by the controller 24 to the database including the plurality of feature vectors, and store and use them as basic data for determining road surface condition.

As is apparent from the above, the present disclosure can improve the autonomous driving performance of an autonomous driving vehicle by minimizing a calculation amount of a road surface condition sensing system and promptly reflecting road surface condition and displaying it to a driver.

Accordingly, the present disclosure can improve road surface condition sensing performance by providing a highly reliable road surface condition sensing method by directly analyzing the road surface condition without depending on weather information such as temperature or humidity.

Although the present disclosure has been described with reference to an embodiment illustrated in the accompanying drawings, it will be understood by those skilled in the art that it is only illustrative, and various changes and modifications may be made without departing from the scope of the present disclosure. Accordingly, the true scope of the present disclosure should be determined only by the appended claims.

What is claimed is:

1. A road surface condition sensing system comprising:
   an acoustic sensing unit sensing an acoustic signal of a lower portion of a vehicle; and
   a control unit calculating a feature vector by Fourier transforming the sensed acoustic signal, selecting one feature vector having the smallest relative distance to the calculated feature vector among a plurality of previously stored feature vectors by comparing the calculated feature vector with the plurality of previously stored feature vectors, and outputting a road surface condition corresponding to the selected one feature vector,
   wherein the feature vector is calculated by generating a cepstrum based on the sensed acoustic signal, extracting feature points based on the generated cepstrum, and calculating the feature vector based on the extracted feature points, and
   wherein the plurality of previously stored feature vectors are stored as neurons in a database of a neuromorphic system.

2. The road surface condition sensing system according to claim 1, wherein the control unit provides the outputted road surface condition to an autonomous drive control system of the vehicle.

3. The road surface condition sensing system according to claim 2, wherein the autonomous drive control system of the vehicle comprises at least one of a forward collision warning system (FCW), an autonomous emergency braking system (AEBS), an adaptive cruise control system (ACC), and a rear-end collision warning system (RCW).

4. The road surface condition sensing system according to claim 1, wherein the control unit learns the calculated feature vector and additionally input the calculated feature vector into the plurality of previously stored feature vectors.

5. A road surface condition sensing system comprising:
   an acoustic sensing unit sensing an acoustic signal of a lower portion of a vehicle;
   a neuromorphic system in which a plurality of neurons storing at least one pattern vector are connected by a parallel bus; and
   a control unit calculating a feature vector by Fourier transforming a sensed acoustic signal, inputting the generated feature vector to the neuromorphic system, returning one feature vector having the smallest relative distance to the inputted feature vector among a plurality of neurons stored in the neuromorphic system, and outputting a road surface condition corresponding to the one feature vector,
   wherein the feature vector is calculated by generating a cepstrum based on the sensed acoustic signal, extracting feature points based on the generated cepstrum, and calculating the feature vector based on the extracted feature points, and wherein the plurality of previously stored feature vectors are stored as neurons in a database of a neuromorphic system.

6. A road surface condition sensing method comprising:

sensing, by an acoustic sensing unit, an acoustic signal of a lower portion of a vehicle;

calculating, by a control unit, a feature vector by Fourier transforming the sensed acoustic signal;

selecting, by the control unit, one feature vector having the smallest relative distance to the calculated feature vector among a plurality of previously stored feature vectors by comparing the calculated feature vector with the plurality of previously stored feature vectors; and outputting, by the control unit, a road surface condition corresponding to the selected one feature vector, wherein the feature vector is calculated by generating a cepstrum based on the sensed acoustic signal, extracting feature points based on the generated cepstrum, and calculating the feature vector based on the extracted feature points, and wherein the plurality of previously stored feature vectors are stored as neurons in a database of a neuromorphic system.

7. The road surface condition sensing method according to claim 6, further comprising providing, by the control unit, the outputted road surface condition to an autonomous drive control system of the vehicle.

8. The road surface condition sensing method according to claim 6, further comprising:

learning, by the control unit, the calculated feature vector; and additionally inputting, by the control unit, the calculated feature vector into the plurality of previously stored feature vectors.

* * * * *